US012056426B2

(12) United States Patent
Tang et al.

(10) Patent No.: US 12,056,426 B2
(45) Date of Patent: Aug. 6, 2024

(54) HARDWARE-IN-LOOP SIMULATION EXPERIMENT PLATFORM OF MULTIPLE INPUT AND MULTIPLE OUTPUT LOOP CONTROL FOR MSWI PROCESS

(71) Applicant: BEIJING UNIVERSITY OF TECHNOLOGY, Beijing (CN)

(72) Inventors: Jian Tang, Beijing (CN); TianZheng Wang, Beijing (CN); Heng Xia, Beijing (CN); Junfei Qiao, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 18/201,578

(22) Filed: May 24, 2023

(65) Prior Publication Data
US 2023/0297736 A1    Sep. 21, 2023

Related U.S. Application Data

(63) Continuation of application No. PCT/CN2022/127860, filed on Oct. 27, 2022.

(30) Foreign Application Priority Data

Nov. 11, 2021 (CN) .......................... 202111333717.4

(51) Int. Cl.
*G06F 30/20* (2020.01)
*G06Q 10/30* (2023.01)
(Continued)

(52) U.S. Cl.
CPC ............ *G06F 30/20* (2020.01); *G06Q 10/30* (2013.01); *G05B 2219/23446* (2013.01); *G06F 2111/10* (2020.01); *G06N 20/20* (2019.01)

(58) Field of Classification Search
CPC ................. G06F 30/20; G06F 2111/10; G05B 2219/23446
See application file for complete search history.

(56) References Cited

U.S. PATENT DOCUMENTS 10,198,536 B2 * 2/2019 Rathgeb ................. G05B 17/02
2018/0311674 A1 11/2018 De Vries

FOREIGN PATENT DOCUMENTS

| CN | 103455635 A | 12/2013 |
| CN | 109960873 A | 7/2019 |

(Continued)

OTHER PUBLICATIONS

Aijun et al., "Development of Semi-physical Simulation Platform for Monitoring Municipal Solid Waste Incineration Process", Jun. 2021 (Year: 2021).*

(Continued)

*Primary Examiner* — Boris Gorney
*Assistant Examiner* — David A Hopkins
(74) *Attorney, Agent, or Firm* — J.C. PATENTS

(57) ABSTRACT

A hardware-in-loop simulation experiment platform of multiple input and multiple output loop control for MSWI process includes a real equipment layer and a virtual object layer, where in the real equipment layer and the virtual object layer realize communication through hard wirings and data acquisition cards, the real equipment layer and virtual object layer realize communication in OPC mode through Ethernet; the real equipment layer comprises monitoring equipment and control equipment, and the virtual object layer comprises an MSWI actuator model, an MSWI instrument device model and an MSWI process object model which are respectively operated in different industrial personal computers. The hardware-in-loop simulation experiment platform of multiple input and multiple output loop control for MSWI process provided by the invention is (Continued)

used for providing a reliable engineering verification environment for MSWI process control.

7 Claims, 10 Drawing Sheets

(51) Int. Cl.
*G06F 111/10* (2020.01)
*G06N 20/20* (2019.01)

(56) References Cited

FOREIGN PATENT DOCUMENTS

| CN | 110991756 A | 4/2020 | |
|---|---|---|---|
| CN | 112464544 A | 3/2021 | |
| CN | 113189891 A | 7/2021 | |
| CN | 114035450 A | 2/2022 | |
| EP | 1589283 A1 * | 10/2005 | ............... F23G 5/50 |
| WO | WO-2005066727 A1 * | 7/2005 | ........... G05B 13/026 |

OTHER PUBLICATIONS

Kardani, Navid, et al. "Modelling of municipal solid waste gasification using an optimised ensemble soft computing model." Fuel 289 (2021): 119903. (Year: 2021).*

Advantech, "e Automation Application Stories", Copyright date 2008, URL: advcloudfiles(dot)advantech(dot)com/ecatalog/2011/201109091341(dot)pdf (Year: 2008).*

Aleksovski, Darko, Juš Kocijan, and Sašo Džeroski. "Ensembles of fuzzy linear model trees for the identification of multioutput systems." IEEE Transactions on Fuzzy Systems 24.4 (2015): 916-929. See the abstract and § III, see p. 927 subsection G (Year: 2015).*

Alobaid, Falah, et al. "Dynamic simulation of a municipal solid waste incinerator." Energy 149 (2018): 230-249. See the abstract and p. 241 col. 1 (Year: 2018).*

Atif Majeed, "How a PLC do the Scaling for a Sensor?", LinkedIn Blog Posting, Jul. 11, 2018, URL: www(dot)linkedin(dot)com/pulse/how-plc-do-scaling-sensor-atif-awan—see the section "Linear Scaling" (Year: 2018).*

Muhammad Ashraf, Waqar, et al. "Optimization of a 660 MWe supercritical power plant performance—a case of Industry 4.0 in the data-driven operational management. Part 2. Power generation." Energies 13.21 (2020): 5619. See the abstract and pp. 4-7 (Year: 2020).*

Bdour, Mathhar Abdelmahdi A. Electrical power generation from residual biomass by combustion in externally fired gas turbines (EFGT). Diss. Dissertation, Rostock, Universität Rostock. Agrar- und Umweltwissenschaftliche Fakultät, 2017, 2017. See the abstract, p. III, ange p. 36 (Year: 2017).*

Pehrson, Håvard. Modelling and Control of Brobekk Waste Incineration Plant. MS thesis. Institutt for teknisk kybernetikk, 2010. See the abstract and chapter 3 including §§ 3.1-3.2 (Year: 2010).*

Si, Minxing, and Ke Du. "Development of a predictive emissions model using a gradient boosting machine learning method." Environmental Technology & Innovation 20 (2020): 101028. See the abstract and figures 3-4 (Year: 2020).*

Tang, Zhenhao, Yanyan Li, and Andrew Kusiak. "A deep learning model for measuring oxygen content of boiler flue gas." IEEE access 8 (2020): 12268-12278. See the abstract and table 1, see § III and fig. 2 (Year: 2020).*

Wang, Fang, et al. "A hybrid model integrating improved flower pollination algorithm-based feature selection and improved random forest for NOX emission estimation of coal-fired power plants." Measurement 125 (2018): 303-312. See the abstract and §§ 2.2.2 and 3.1-3.2, see fig. 3. (Year: 2018).*

Wang, Tianzheng, Jian Tang, and Heng Xia. "Key controlled variable model of MSWI process based on ensembled decision tree algorithm." 2021 China Automation Congress (CAC). IEEE, 2021. See the abstract and § III. (Year: 2021).*

Xia, Heng, et al. "Dioxin emission concentration forecasting model for MSWI process with random forest-based transfer learning." 2020 39th Chinese Control Conference (CCC). IEEE, 2020. See the abstract and §§ 2.1-2.3, and §§ 3.1-3.3 (Year: 2020).*

You, Haihui, et al. "Comparison of ANN (MLP), ANFIS, SVM, and RF models for the online classification of heating value of burning municipal solid waste in circulating fluidized bed incinerators." Waste management 68 (2017): 186-197. See the abstract and p. 190 (Year: 2017).*

International Search Report of PCT/CN2022/127860.

* cited by examiner

HARDWARE-IN-LOOP SIMULATION EXPERIMENT PLATFORM OF MULTIPLE INPUT AND MULTIPLE OUTPUT LOOP CONTROL FOR MSWI PROCESS

CROSS-REFERENCE TO RELATED APPLICATIONS

This application is a continuation of international application PCT/CN2022/127860 filed on Oct. 27, 2022, which claims priority to Chinese application No. 202111333717.4, filed on Nov. 11, 2021, the contents of the above identified applications are hereby incorporated by reference in its entirety and made a part of this specification.

TECHNICAL FIELD

The invention relates to the technical field of municipal solid waste incineration, in particular to a hardware-in-loop simulation experiment platform of multiple input and multiple output loop control for MSWI process.

BACKGROUND

At present, there are still many problems to be solved in terms of recycling mechanism, treatment technology and management strategy of municipal solid waste (MSW) in China, the most prominent of which is the problem of excessive pollutant discharge. Municipal solid waste incineration (MSWI) is a treatment technology widely used to realize MSW harmlessness, reduction, and resource utilization. As a typical complex industrial process, it has the characteristics of multi-variable, strong coupling, and strong nonlinearity. According to the current situation, it is necessary to study the appropriate MSWI process technology according to the characteristics of MSW.

To conduct research on the effective control of MSWI process technology, it is first necessary to construct the process model. Existing simulation platforms for MSWI process models are mostly limited to single-loop control, and do not consider the multiple-input and multiple-output characteristics of the actual MSWI process controlled objects. Moreover, the actuator model, process object model and instrument model are not separated, and the authenticity of signal transmission and possible interference between actual devices are ignored; at the same time, in the face of complex industrial processes, traditional simulation platforms mostly use physical equipment such as water tanks, pumps, valves, and frequency converters as the basis to build simplified industrial process control equipment prototype, although the equipment prototype is conducive to forming an intuitive impression of the equipment, it has limitations due to issues such as site size and safety; this makes the development of a simulation platform an inevitable requirement.

SUMMARY

The object of the present invention is to provide a hardware-in-loop simulation experiment platform of multiple input and multiple output loop control for MSWI process, which is used to provide a reliable engineering verification environment for MSWI process control.

To achieve the above object, the present invention provides the following scheme:

A hardware-in-loop simulation experiment platform of multiple input and multiple output loop control for MSWI process comprises: real equipment layer and virtual object layer, where in the real equipment layer and the virtual object layer realize communication through hard wirings and data acquisition cards, the real equipment layer and virtual object layer realize communication in OPC (OLE for Process Control) mode through Ethernet.

The real equipment layer comprises monitoring equipment and control equipment; the monitoring equipment is used to realize the monitoring of MSWI process state, download program in the control equipment and set PID (Proportion Integral Differential) loop parameters; the control equipment adopts the same controller as the actual site; the program downloaded in the controller is used to carry out loop control and variable conversion for the MSWI process.

The virtual object layer includes MSWI actuator model, MSWI instrument device models and MSWI process object models running in different industrial personal computer respectively; the object model of MSWI process is based on ensemble random forest and gradient boosting decision tree (EnRFGBDT) algorithm to predict three key controlled variables of furnace temperature (FT), flue gas oxygen content (OC) and main steam flow rate (BSF).

The MSWI actuator model simulates signals sent from the real equipment layer to transmit the MSWI process actuator variables to the MSWI process object model; the MSWI instrument device model receives the MSWI process instrument device variables obtained from the simulation of the MSWI process object model and performs simulation, and transmits to the real device layer; the MSWI process object model is established in three ways: data simulation, mechanism modeling and data-driven; by receiving MSWI process actuator variables for simulation, MSWI process instrument device variables are obtained and transmitted to the MSWI instrument device model.

Optionally, the data acquisition card adopts an Advantech board.

Optionally, the MSWI actuator model is expressed by first-order transfer function mode with time delay, a signal conversion is established between the real equipment layer and the industrial computer equipped with the MSWI actuator model, which can be expressed as:

$$P^A_{true} = \frac{P^A_{max} - P^A_{min}}{U^A_{max} - U^A_{min}} * U^A_{true}$$

wherein: $P_{max}^A$ is the upper limit of the actuator variable with a physical value, $P_{min}^A$ is the lower limit of the actuator variable with a physical value, $U_{max}^A$ is limit of the voltage signal output after the actuator variable is converted, $U_{min}^A$ is the lower limit of the voltage signal output after the actuator variable conversion, $U_{true}^A$ is the actual value of the electrical signal of actuator variable, $P_{true}^A$ is the current actual value of the actuator variable with a physical value.

Optionally, when the MSWI actuator model is a feeder, it can be described as follows:

$$\dot{F}_{feeder} = -\frac{1}{T_{feeder}} F_{feeder} + \frac{K_{feeder}}{T_{feeder}} U_{feeder}(t-\tau)$$

wherein: $F_{feeder}$ is the feeding speed of the feeder, $U_{feeder}$ is the frequency of the feeder motor, $T_{feeder}$ is the response time constant of the feeder, and $K_{feeder}$ is the ratio between the frequency of the motor of the feeder and the feeding speed of the feeder in the steady state, $\tau$ is the lag time.

Optionally, the MSWI instrument is expressed by first-order transfer function model, a signal conversion is established between the real equipment layer and the industrial computer equipped with the model of MSWI instrument device, which can be expressed as:

$$U_{true}^I = \frac{U_{max}^I - U_{min}^I}{P_{max}^I - P_{min}^I} * P_{true}^I$$

wherein: $P_{max}^I$ the upper limit of the instrument variable, $P_{min}^I$ is the lower limit of the instrument variable, $U_{max}^I$ is the upper limit of the voltage signal output after the instrument variable conversion, $U_{min}^I$ is the lower limit of the voltage signal output after the instrument variable conversion, $U_{true}^I$ is the current real value of the instrument variable electrical signal, and $P_{true}^I$ is the actual current value of an instrument variable with a physical value.

Optionally, when the MSWI instrument device model is primary air flowmeter, it can be described below:

$$\dot{Q}_{pri} = -\frac{1}{T_{pri}} Q_{pri} + \frac{K_{pri}}{T_{pri}} U_{pri}$$

wherein: $Q_{pri}$ is the primary air flow per unit time, $U_{pri}$ is the primary air valve opening, $T_{pri}$ is the primary air volume response time constant, and $K_{pri}$ is the proportional relationship between the primary air valve opening and the primary air flow per unit time in steady state.

According to the specific embodiments provided by the present invention, the present invention discloses the following technical effects: the hardware-in-loop simulation experiment platform of multiple input and multiple output loop control for MSWI process by the present invention carries the MSWI actuator model and the MSWI instrument device model on two industrial personal computers, the data acquisition card uses electrical signals to realize the signal transmission between the loop control system, the actuator and the instrument device, which truly simulates the type of signal transmission in the field and avoids the lack of signals in the traditional simulation experiment platform and unknown factors such as transmission interruption and signal interference exist in the field; through the model building of three key controlled process variables and the adjustment of the PID loop, the effectiveness of hardware-in-loop simulation experiment platform of multiple input and multiple output loop control for MSWI process proposed by the present invention is verified. It also provides a reliable engineering verification environment for other researches on the optimization control of MSWI process.

DESCRIPTION OF THE DRAWINGS

In order to more clearly illustrate the technical solutions in the embodiments of the present invention or the prior art, the following will briefly introduce the accompanying drawings required in the embodiments. Obviously, the accompanying drawings in the following description are only some embodiments of the present invention, for technical personnel in this field, other drawings can also be obtained according to these drawings without paying creative labor.

PREFERRED EMBODIMENTS

Figure 1:
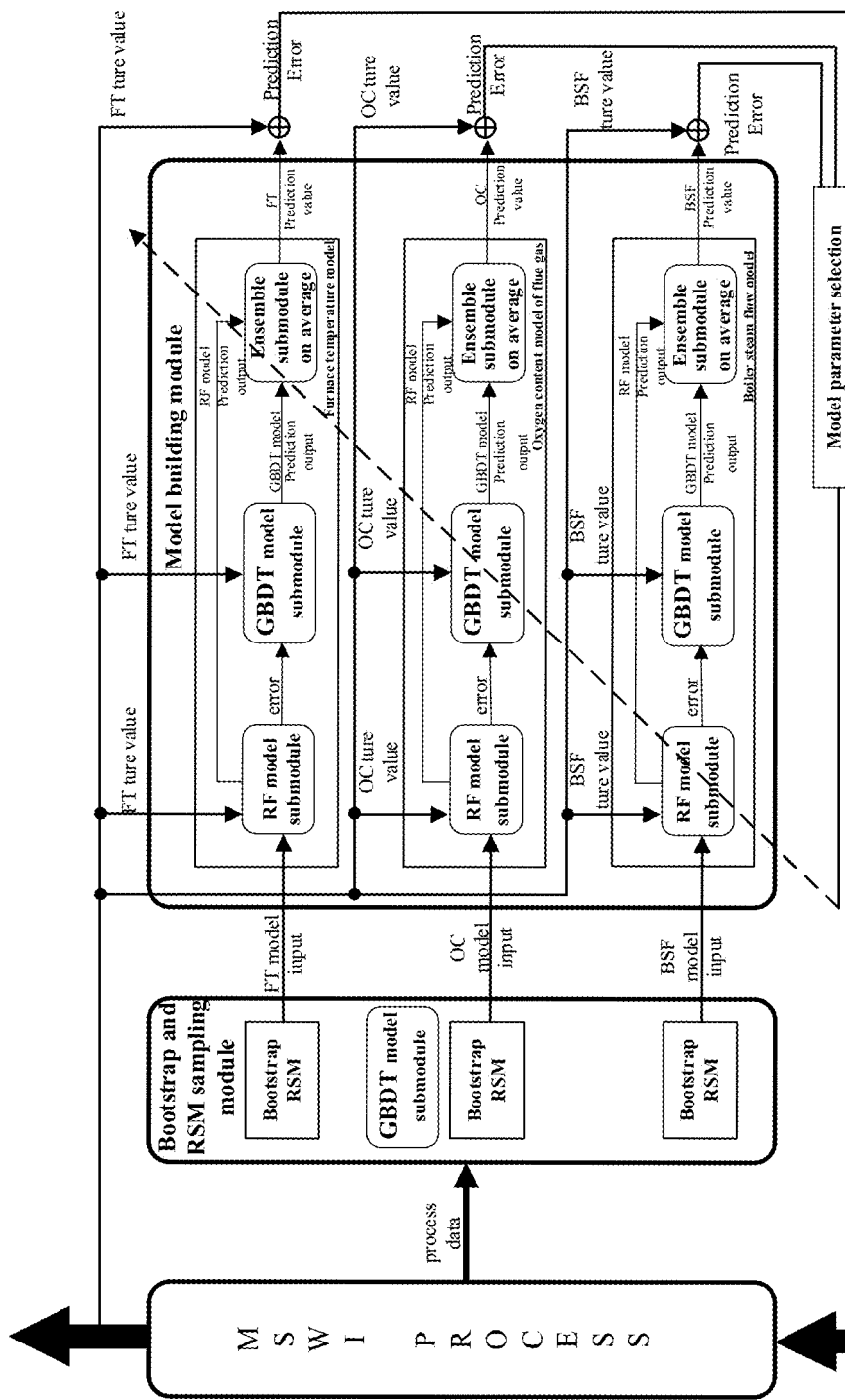
FIG. 1 is the MSWI process object model of the embodiment of the present invention.

The technical scheme in the embodiment of the invention will be described clearly and completely in combination with the drawings attached in the embodiment of the invention. Obviously, the embodiments described are only partial embodiments of the invention, but not all embodiments. Based on the embodiments of the present invention, all other embodiments obtained by ordinary technicians in the field without creative labor are within the scope of protection of the invention.

The object of the present invention is to provide hardware-in-loop simulation experiment platform of multiple input and multiple output loop control for MSWI process, which is used to provide a reliable engineering verification environment for MSWI process control.

In order to make the above objects, features and advantages of the present invention more comprehensible, the present invention will be further described in detail below in conjunction with the accompanying drawings and specific embodiments.

A hardware-in-loop simulation experiment platform of multiple input and multiple output loop control for MSWI process provides by the invention, comprises: real equipment layer and virtual object layer, where in the real equipment layer and the virtual object layer realize communication through hard wirings and data acquisition cards, the real equipment layer and virtual object layer realize communication in OPC mode through Ethernet.

The real equipment layer comprises monitoring equipment and control equipment; the monitoring equipment is used to realize the monitoring of MSWI process state, download program in the control equipment and set PID loop parameters; the control equipment adopts the same controller as the actual site; the program downloaded in the controller is used to carry out loop control and variable conversion for the MSWI process.

The virtual object layer includes MSWI actuator model, MSWI instrument device models and MSWI process object models running in different industrial personal computer respectively; the object model of MSWI process is based on ensemble random forest and gradient boosting decision tree (EnRFGBDT) algorithm to predict three key controlled variables of furnace temperature (FT), flue gas oxygen content (OC) and main steam flow rate (BSF).

The MSWI actuator model simulates signals sent from the real equipment layer to transmit the MSWI process actuator variables to the MSWI process object model; the MSWI instrument device model receives the MSWI process instrument device variables obtained from the simulation of the MSWI process object model and performs simulation, and transmits to the real device layer; the MSWI process object model is established in three ways: data simulation, mechanism modeling and data-driven; by receiving MSWI process actuator variables for simulation, MSWI process instrument device variables are obtained and transmitted to the MSWI instrument device model.

Therefore, using the combination of real equipment layer and virtual object layer to build a multi-input multi-output loop control hardware-in-loop simulation experiment platform for MSWI process can avoid the lack of signal communication interruption, signal transmission delay and other problems in the traditional simulation platform, and can simulate unknown interference factors that exist in actual industrial sites.

The MSWI process object model uses the ensemble decision tree algorithm (mixed ensemble random forest and gradient boosting decision tree (EnRFGBDT) method) to build the MSWI process object model, which includes Bootstrap and Random Sub-space Method (RSM) module and model construction module, the latter includes a random forest (RF) model sub-module, a gradient boosting decision tree (GBDT) model sub-module and an average integration sub-module, as shown in FIG. 1.

The multiple-input multiple-output modeling problem is described as the following formula, and its purpose is to minimize the square root of the model prediction error, and then build a high-precision model, such as minimum samples (MinSamples), number of features (FeaturesNum), number of decision trees (Tn), and number of iterations (Iteration).

wherein $\hat{y}_{RF\text{-}FT}^{j^{FT}}$, $\hat{y}_{RF\text{-}OC}^{j^{OC}}$ and $\hat{y}_{RF\text{-}BSF}^{j^{BSF}}$ represent the predicted values of FT, OC and BSF in the j-th RF sub-model $f_{RF}^j(\square)$; $y_{RF\text{-}FT}^{j^{FT}}$, $y_{RF\text{-}OC}^{j^{OC}}$ and $y_{RF\text{-}BSF}^{j^{BSF}}$ represent the real values of FT, OC and BSF in the j-th RF sub-model $f_{RF}^j(\square)$; $j^{FT}$, $j^{OC}$ and $j^{BSF}$ represent the number of training subsets and RF sub-models in FT, OC and BSF models; $f_{RF\text{-}FT}^{j^{FT}}(\bullet)$, $f_{RF\text{-}OC}^{j^{OC}}(\bullet)$ and $f_{RF\text{-}BSF}^{j^{BSF}}(\bullet)$ represent the predicted output of RF sub-model in FT, OC and BSF models, respectively; $f_{GBDT\text{-}FT}^{j^{FT},i^{FT}}(\bullet)$, $f_{GBDT\text{-}OC}^{j^{OC},i^{OC}}(\bullet)$ and $f_{RF\text{-}BSF}^{j^{BSF},i^{BSF}}(\bullet)$ represent the predicted output of GBDT sub-model in FT, OC and BSF models, $i^{FT}$, $i^{OC}$ and $i^{BSF}$ respectively represent the number of models of the GBDT sub-model in the FT, OC and BSF models, that is, the number of iterations.

The functions of each module in FIG. 1 are as follows:

(1) Bootstrap and RSM module: select $M^{FT}$ th input features from MSWI process data $X_{MSWI}=\{x_n\}_{n=1}^N \in R^{N \times M}$, randomly sample $N^{FT}$ times to generate $J^{FT}$ training subsets $\{X_{FT}^{j^{FT}}\}_{j^{FT}=1}^{J^{FT}}$;

(2) Model building module:

① RF model sub-module: use the generated training subset $\{X_{FT}^{j^{FT}}\}_{j^{FT}=1}^{J^{FT}}$ to build the RF sub-model $\{f_{RF\square FT}^{j^{FT}}(\square)\}_{j^{FT}=1}^{J^{FT}}$ and then subtract the predicted value $\{\hat{y}_{RF\square FT}^{j^{FT}}\}_{j^{FT}=1}^{J^{FT}}$ from the real value $\{\hat{y}_{FT}^{j^{FT},0}\}_{j^{FT}=1}^{J^{FT}}$ to get the prediction error $\{e_{FT}^{j^{FT}}\}_{j^{FT}=1}^{J^{FT}}$;

② GBDT model sub-module: After iterating $I^{FT}$ times with the error $\{e_{FT}^{j^{FT},0}\}_{j^{FT}=1}^{J^{FT}}$ as the training subset, a GBDT sub-model $\{\{f_{GBDT\square FT}^{j^{FT},i^{FT}}(\square)\}_{i^{FT}=1}^{I^{FT}}\}_{j^{FT}=1}^{J^{FT}}$ of $I^{FT} \times J^{FT}$ is constructed;

③ Average integration sub-module: the prediction output of the RF sub-model $\{\hat{y}_{RF\cdot FT}^{j^{FT},i^{FT}}\}_{i^{FT}=1}^{I^{FT}}$ and the prediction output of the GBDT sub-model $\{\hat{y}_{GBDT\cdot FT}^{j^{FT},i^{FT}}\}_{i^{FT}=1}^{I^{FT}}$ are integrated through a simple average to obtain the final prediction output of the FT model $\hat{y}_{FT}$.

Bootstrap and RSM Module:

First, use Bootstrap to extract a training subset with the same number of samples as the modeling data to reduce the correlation between sub-models; then, use the RSM mechanism to randomly select features; finally, generate J-th $$\text{Min } F = \sqrt{\frac{1}{N}\left(\sum\left(\hat{y}_{FT}^{j^{FT}} - y_{FT}^{j^{FT}}\right)^2 + \sum\left(\hat{y}_{OC}^{j^{OC}} - y_{OC}^{j^{OC}}\right)^2 + \sum\left(\hat{y}_{BSF}^{j^{BSF}} - y_{BSF}^{j^{BSF}}\right)^2\right)}$$

$$= \sqrt{\frac{1}{N}\left\{\begin{array}{l}\sum\left(\frac{1}{J^{FT}}\sum_{j^{FT}=1}^{J^{FT}}\left(f_{RF-FT}^{j^{FT}}(\cdot) + \sum_{i^{FT}=1}^{I^{FT}} f_{GBDT-FT}^{j^{FT},i^{FT}}(\cdot)\right) - y_{FT}^{j^{FT}}\right)^2 \\ + \sum\left(\frac{1}{J^{OC}}\sum_{j^{OC}=1}^{J^{OC}}\left(f_{RF-OC}^{j^{OC}}(\cdot) + \sum_{i^{OC}=1}^{I^{OC}} f_{GBDT-OC}^{j^{OC},i^{OC}}(\cdot)\right) - y_{OC}^{j^{OC}}\right)^2 \\ + \sum\left(\frac{1}{J^{BSF}}\sum_{j^{BSF}=1}^{J^{BSF}}\left(f_{RF-BSF}^{j^{BSF}}(\cdot) + \sum_{i^{BSF}=1}^{I^{BSF}} f_{GBD-BSF}^{j^{BSF},i^{BSF}}(\cdot)\right) - y_{BSF}^{j^{BSF}}\right)^2\end{array}\right\}}$$

$$\text{s.t. } \begin{cases} 1 \leq \text{Min Samples} < N \\ 1 \leq \text{Features Num} \leq M \\ 1 \leq Tn < 500 \\ 1 \leq \text{Iterations} < 100 \end{cases}$$

training subset containing N samples and M features (where N, M and J are selected empirically).

The generation process of the training subset can be expressed as:

$$X_{MSWI} = \{x_n\}_{n=1}^N \in R^{N \times M} \bigg\} \Longrightarrow \begin{cases} X_{M_{type}}^1 = \left\{\left(x_{M_{type}}^{1,M^1}\right)_n\right\}_{n=1}^N \\ \ldots \\ X_{M_{type}}^j = \left\{\left(x_{M_{type}}^{j,M^j}\right)_n\right\}_{n=1}^N \\ \ldots \\ X_{M_{type}}^J = \left\{\left(x_{M_{type}}^{J,M^J}\right)_n\right\}_{n=1}^N \end{cases}$$

wherein: $X_{M_{type}}^j$ is the training subset for the j-th selected number $M_{type}$ controlled variable, $M_{type}=\{FT, OC, BSF, \ldots\}$, $(x_{M_{type}}^{j,M^j})_n$ represents the n-th input sample of the j-th training subset, and $M^j$ represents the number of input features included in j-th training subsets.

RF Model Sub-Module:

Remove repeated samples due to random sampling in the training subset $$\left\{\left(x_{FT}^{j^{FT},M^{j^{FT}}}\right)_n\right\}_{n=1}^N,$$

and mark them as $$\left\{\left(x_{FT}^{j^{FT},M^{j^{FT}}}\right)_{n_{sel}}\right\}_{n_{sel}=1}^{N_{sel}},$$

wherein $n_{sel}$ represents the sample currently selected, $N_{sel}$ represents the total number of samples selected for sampling (set according to experience); then, the m-th input feature $x_{FT}^{j^{FT},m}$ is used as a segmentation variable, and the value $x_{FT \cdot n_{sel}}^{j^{FT},m}$ corresponding to the $n_{sel}$ sample is used as the segmentation point to divide the input feature space into two regions $R_1^{FT}$ and $R_2^{FT}$.

$$\begin{cases} R_1^{FT}\left(m, x_{FT \cdot n_{sel}}^{FT,m}\right) = \left\{x_{FT}^{j^{FT},M^{jFT}} \mid x^{j^{FT},m} \leq x_{FT \cdot n_{sel}}^{FT,m}\right\} \\ R_2^{FT}\left(m, x_{FT \cdot n_{sel}}^{FT,m}\right) = \left\{x_{FT}^{j^{FT},M^{jFT}} \mid x^{j^{FT},m} > x_{FT \cdot n_{sel}}^{FT,m}\right\} \end{cases}$$

Based on the following criteria, the optimal segmentation variables and segmentation points are found by traversal:

$$\min_{m, x_{FT \cdot n_{sel}}^{j^{FT},m}} \left[ \min_{C_1} \sum_{x_{FT}^{j^{FT},m} \in R_1^{FT}\left(m, x_{FT \cdot n_{sel}}^{j^{FT},m}\right)} \left(y_1^{j^{FT}} - C_1^{FT}\right)^2 + \min_{C_2} \sum_{x_{FT}^{j^{FT},m} \in R_2^{FT}\left(m, x_{FT \cdot n_{sel}}^{j^{FT},m}\right)} \left(y_2^{j^{FT}} - C_2^{FT}\right)^2 \right]$$

wherein: $Y_1^{j^{FT}}$ and $Y_2^{j^{FT}}$ represent the real values of the $j^{FT}$ training subset in the regions $R_1^{FT}$ and $R_2^{FT}$ respectively; $C_1^{FT}$ and $C_2^{FT}$ represent the average values of the real values in the regions $R_1^{FT}$ and $R_2^{FT}$ respectively.

According to the above formula, the optimal segmentation variable and segmentation point are found by traversal, thereby dividing the sample space into two regions; then, repeat the traversal of the divided regions, and then find the optimal segmentation variable and segmentation point in this region, until the number of leaf node training samples is less than the empirically set threshold $\theta_{RF \square FT}$; finally, the input feature space is divided into K regions and marked as $R_1, \ldots, R_k, \ldots, R_K$.

The RF sub-model based on the CART (Classification And Regression Tree) regression tree can be expressed as:

$$\hat{y}_{RF \cdot FT}^{j^{FT}} = f_{RF \cdot FT}^{j^{FT}}(\cdot) = \sum_{k=1}^K c_{RF \cdot FT}^k I\left(x_{FT}^{j^{FT},M^{j^{FT}}} \in R_k\right)$$

$$C_{RF0FT}^k = \frac{1}{N_{R_k}} \sum_{n_{R_k}=1}^{N_{R_k}} y_{FT \cdot n_{R_k}}^{j^{FT}}, N_{R_k} \leq \theta_{RF \cdot FT}$$

wherein $N_{R_k}$ represents the number of samples contained in the region $R_k$, $$y_{FT \cdot n_{R_k}}^{j^{FT}}$$

is the $n_{R_k}$ value of the $j^{FT}$-th training subset in the region $R_k$; $I(\bullet)$ represents the indicator function, which is 1 when $$x_{FT}^{j^{FT},M^{j^{FT}}}$$

$\in R_k$ exists, otherwise it is 0.

The prediction error of the RF sub-model constructed by the training subset is:

$$e_{FT}^{j^{FT},0} = y_{FT}^{j^{FT}} - \hat{y}_{RF \cdot FT}^{j^{FT}} = \{(e_{FT}^{j^{FT},0})_n\}_{n=1}^N$$

where: $(e_{FT}^{j^{FT},0})_n$ represents the prediction error of the nth training sample. Finally, the predicted output $\hat{y}_{RF \cdot FT}^{j^{FT}}$ of the RF sub-model is subtracted from the true value $\hat{y}_{RF \cdot FT}^{j^{FT}}$ to obtain the output error $\{e_{FT}^{j^{FT},0}\}_{j^{FT}=1}^{j^{FT}}$.

GBDT Model Sub-Module:

Building the first sub-model $f_{GBDT \cdot FT}^{j^{FT},1}(\bullet)$, which can be expressed as:

$$\hat{y}_{GBDT \cdot FT}^{j^{FT},1} = f_{GBDT \cdot FT}^{j^{FT},1}\left(\left\{\left(x_{FT}^{j^{FT},M^{j^{FT}}}\right)_n\right\}_{n=1}^N, \left\{\left(e_{FT}^{j^{FT},0}\right)_n\right\}_{n=1}^N\right)$$

wherein: $\hat{y}_{GBDT \cdot FT}^{j^{FT},1}$ represents the output of the first GBDT sub-model. The loss function for the above sub-models is defined as follows:

$$L_{GBDT \cdot FT}\left(y^{j^{FT}}, \hat{y}_{GBDT \cdot FT}^{j^{FT},1}\right) = \frac{1}{2} \sum_{n=1}^N \left(\left(e_{FT}^{j^{FT},0}\right)_n - \left(\hat{y}_{GBDT \cdot FT}^{j^{FT},1}\right)_n\right)^2$$

wherein: $(\hat{y}_{GBDT \cdot FT}^{j^{FT},1})_n$, indicates the predicted value of the nth sample in the $j^{FT}$-th training subset.

Compute Compute the output residuals $e_{FT}^{j,1}$ of the sub-model $f_{GBDT \cdot FT}^{j^{FT},1}(\bullet)$, which can be expressed as follows:

$$e_{FT}^{j^{FT},1} = e_{FT}^{j^{FT},0} - f_{GBDT \cdot FT}^{j^{FT},1}(\cdot)$$
$$= y_{FT}^{j^{FT}} - f_{RF \cdot FT}^{j^{FT}}(\cdot) - f_{GBDT \cdot FT}^{j^{FT},1}(\cdot)$$

$$= y_{FT}^{jFT} - \hat{y}_{RF \cdot FT}^{jFT} - \hat{y}_{GBDT \cdot FT}^{jFT,1}$$

$e_{FT}^{jFT,1}$ as the truth value of the output space of the training subset in the second GBDT sub-model $f_{GBDT \cdot FT}^{jFT,2}(\cdot)$. Likewise, the second GBDT sub-model can be expressed as:

$$\hat{y}_{GBDT \cdot FT}^{jFT,2} = f_{GBDT \cdot FT}^{jFT,2}\left(\{(x_{FT}^{jFT}, M^{jFT})_n\}_{n=1}^{N}, \{(e_{FT}^{jFT,1})_n\}_{n=1}^{N}\right)$$

where: $(e_{FT}^{jFT,1})_n$ is the prediction error of the nth sample in the first GBDT sub-model.

It can be concluded that the $i^{FT}$-th GBDT sub-model can be marked as $f_{GBDT \cdot FT}^{jFT,iFT}(\cdot)$ and its residual is calculated as follows:

$$e_{FT}^{jFT,iFT} = y_{FT}^{jFT} - f_{RF \cdot FT}^{jFT}(\cdot) - f_{GBDT \cdot FT}^{jFT,1}(\cdot) -, \cdots, -f_{GBDT \cdot FT}^{jFT,iFT}(\cdot)$$

$$= y_{FT}^{jFT} - \hat{y}_{RF \cdot FT}^{jFT} - \hat{y}_{GBDT \cdot FT}^{jFT,1} -, \cdots, -\hat{y}_{GBDT \cdot FT}^{jFT,iFT}$$

After iteration ($I^{FT}-1$) times, the true value of the output space of the training subset in the $I^{FT}-1$-th sub-model is:

$$e_{FT}^{jFT,IFT-1} = y_{FT}^{jFT} - \hat{y}_{RF \cdot FT}^{jFT} - \hat{y}_{GBDT \cdot FT}^{jFT,1} -, \cdots, -\hat{y}_{GBDT \cdot FT}^{jFT,IFT-1}$$

wherein: $\hat{y}_{GBDT \cdot FT}^{jFT,IFT-1}$ is the predicted output of the $I^{FT}-1$ sub-model $f_{GBDT \cdot FT}^{jFT,IFT-1}(\cdot)$.

Therefore, the $I^{FT}$-th sub-model can be expressed as:

$$\hat{y}_{GBDT \cdot FT}^{jFT,IFT} = f_{GBDT \cdot FT}^{jFT,IFT}\left(\{(x_{FT}^{jFT}, M^{jFT})_n\}_{n=1}^{N}, \{(e_{FT}^{jFT,IFT-1})_n\}_{n=1}^{N}\right)$$

wherein: $(e_{FT}^{jFT,IFT-1})_n$ represents the prediction error of the sample in $I^{FT}-1$-th GBDT sub-model.

Finally, all $I^{FT}$ GBDT sub-models based on $j^{FT}$-th training subset can be expressed as $\{f_{GBDT \cdot FT}^{jFT,iFT}(\cdot)\}_{iFT=1}^{IFT}$ and their output can be expressed as $\{\hat{y}_{GBDT \cdot FT}^{jFT,iFT}\}_{iFT=1}^{IFT}$. Ensemble sub-module on average:

From the construction process of the two sub-modules, it can be concluded that the RF sub-model constructed in parallel can be expressed as $\{f_{RF \cdot FT}^{jFT}(\cdot)\}_{jFT=1}^{JFT}$, the GBDT sub-model of simultaneous cascade and parallel establishment can be expressed as $$\left\{\left(f_{GBDT \cdot FT}^{jFT,iFT}(\cdot)\right)_{iFT=1}^{IFT}\right\}_{jFT=1}^{JFT}.$$

For the $j^{FT}$-th training subset, this invention constructs $I^{FT}$ RF sub-models and $I^{FT}$ GBDT sub-models, and the sum of their predicted outputs is used as the overall output of the training subset, which can be expressed as:

$$\hat{y}_{FT}^{jFT} = \hat{y}_{RF \cdot FT}^{jFT} + \hat{y}_{GBDT \cdot FT}^{jFT,1} +, \cdots, +\hat{y}_{GBDT \cdot FT}^{jFT,iFT} +, \cdots, +\hat{y}_{GBDT \cdot FT}^{jFT,IFT-1}$$

$$= \hat{y}_{RF \cdot FT}^{jFT} + \sum_{iFT=1}^{IFT} \hat{y}_{GBDT \cdot FT}^{jFT,iFT}$$

$$= f_{RF \cdot FT}^{jFT}(\cdot) + \sum_{iFT=1}^{IFT} f_{GBDT \cdot FT}^{jFT,iFT}(\cdot)$$

Since the $J^{FT}$ training subsets are parallel, the above models are combined here by a simple average weighting method, and the final FT model can be expressed as:

$$\hat{y}_{FT} = \frac{1}{J^{FT}} \sum_{jFT=1}^{JFT} \hat{y}_{FT}^{jFT}$$

$$= \frac{1}{J^{FT}} \sum_{jFT=1}^{JFT} \left(f_{RF \cdot FT}^{jFT}(\cdot) + \sum_{iFT=1}^{IFT} f_{GBDT \cdot FT}^{jFT,iFT}(\cdot)\right)$$

The MSWI actuator model is represented by an inertia link with a time constant, and the feeder is taken as an example to describe as follows:

$$\dot{F}_{feeder} = -\frac{1}{T_{feeder}} F_{feeder} + \frac{K_{feeder}}{T_{feeder}} U_{feeder}(t - \tau)$$

wherein: $F_{Feeder}$ is the feeding speed of the feeder, $U_{feeder}$ is the frequency of the feeder motor, $T_{feeder}$ is the response time constant of the feeder, and $K_{feeder}$ is the ratio between the frequency of the motor of the feeder and the feeding speed of the feeder in the steady state, $\tau$ is the lag time.

At the same time, since the real equipment layer and the industrial personal computer equipped with the MSWI actuator model can only be transmitted through electrical signals, it is necessary to establish signal conversion, and the conversion formula is:

$$P_{true}^{A} = \frac{P_{max}^{A} - P_{min}^{A}}{U_{max}^{A} - U_{min}^{A}} * U_{true}^{A}$$

wherein: $P_{max}^{A}$ is the upper limit of the actuator variable with a physical value, $P_{min}^{A}$ is the lower limit of the actuator variable with a physical value, $U_{max}^{A}$ is the upper limit of the voltage signal output after the actuator variable is converted, $U_{min}^{A}$ is the lower limit of the voltage signal output after the actuator variable conversion, $U_{true}^{A}$ is the actual value of the electrical signal of actuator variable, $P_{true}^{A}$ is the current actual value of the actuator variable with a physical value.

The MSWI instrument device model is approximated by a proportional link, and the primary air flowmeter is used as an example to describe as follows:

$$\dot{Q}_{pri} = -\frac{1}{T_{pri}} Q_{pri} + \frac{K_{pri}}{T_{pri}} U_{pri}$$

wherein: $Q_{pri}$ is the primary air flow per unit time, $U_{pri}$ is the primary air valve opening, $T_{pri}$ is the primary air volume response time constant, and $K_{pri}$ is the proportional relationship between the primary air valve opening and the primary air flow per unit time in steady state.

At the same time, since the real equipment layer and the industrial personal computer equipped with the MSWI instrument device model can only be transmitted through electrical signals, it is necessary to establish signal conversion, and the conversion formula is:

$$U_{true}^I = \frac{U_{max}^I - U_{min}^I}{P_{max}^I - P_{min}^I} * P_{true}^I$$

wherein: $P_{max}^I$ is the upper limit of the instrument variable, $P_{max}^I$ is the lower limit of the instrument variable, $U_{max}^I$ is the upper limit of the voltage signal output after the instrument variable conversion, $U_{min}^I$ is the lower limit of the voltage signal output after the instrument variable conversion, $U_{true}^I$ is the current real value of the instrument variable electrical signal, and $P_{true}^I$ is the actual current value of an instrument variable with a physical value.

Figure 2:
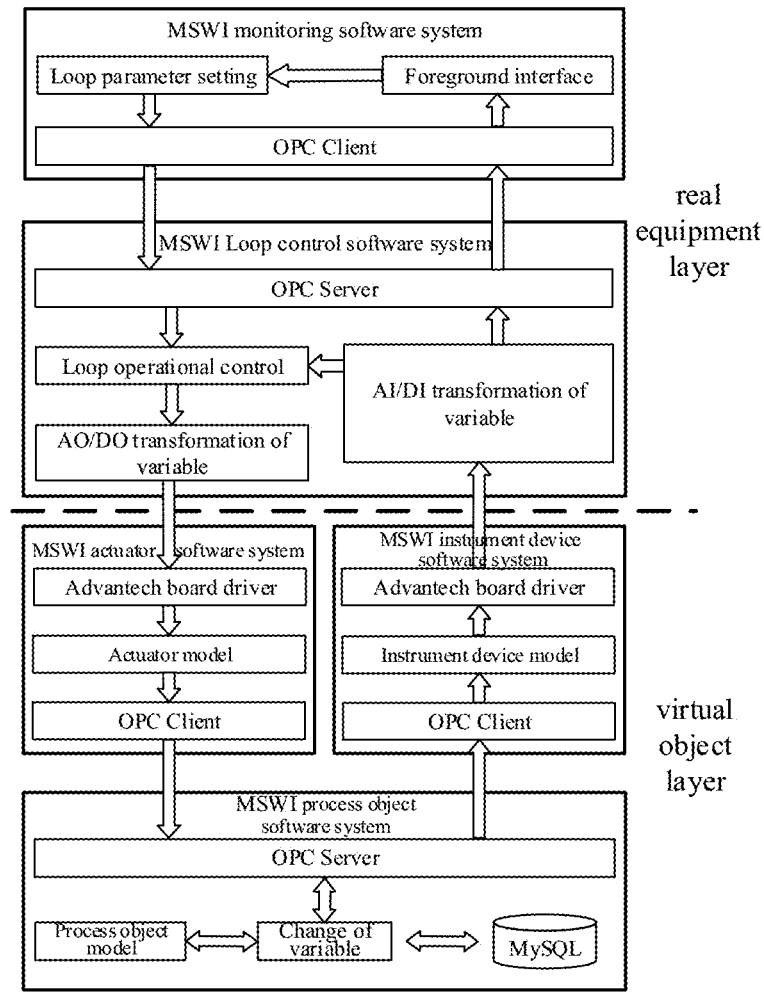
FIG. 2 is the software design structural diagram of the embodiment of the present invention.

The hardware-in-loop simulation experiment platform of multiple input and multiple output loop control for MSWI process provided by the present invention has a software design structure as shown in FIG. 2. The real equipment layer includes MSWI monitoring software system and MSWI loop control software system, and the virtual object layer includes MSWI actuator model software system, MSWI instrument device models software system, and MSWI process object models software system, each of which is installed in the equipment with the OPC environment. The OPC environment configuration method is as follows: configure the distributed component object model (distributed component object model, DCOM) for the device according to the running distribution package provided by the OPC foundation; create a new OPC user, and grant this user the right to run and use the operating system DCOM program; Modify the rules of the operating system firewall (Firewall) about DCOM and OPC, open DCOM access rights; create OPC program inbound rules; configure DCOM security attributes; configure local security policies, so as to realize the data transmit between devices in the platform.

Figure 3:
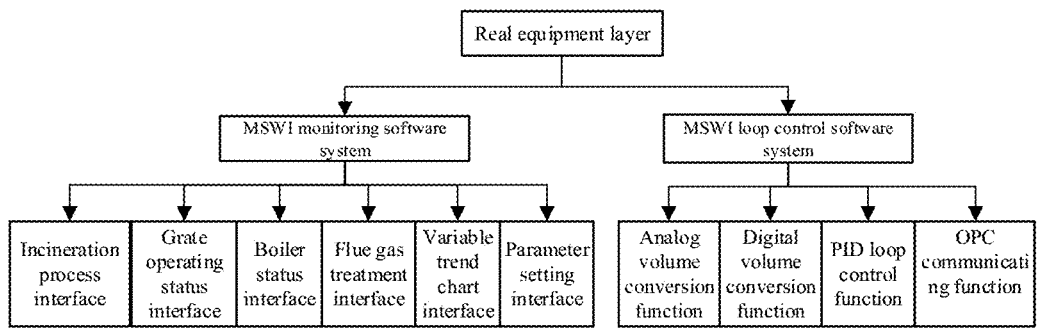
FIG. 3 is a real equipment layer software design structural diagram of an embodiment of the present invention.

The software design structure diagram of the real equipment layer is shown in FIG. 3. The real equipment layer consists of MSWI monitoring software system and the MSWI loop control software system. The MSWI monitoring software system includes incineration process interface, grate status interface, FGD (Flue Gas Desulphurization) processing interface, and parameters setting interface, etc.; MSWI loop control software system includes variable conversion function, PID loop function, OPC communication function, etc.

The OPC client developed in MSWI monitoring software system receives MSWI process variable values sent to the OPC Server in real time during MSWI operation process, and displays all process variables graphically on the incineration process interface, grate status interface, etc., to realize monitoring function during the whole MSWI process. At the same time, it also has the MSWI process loop parameter setting function, which can set and modify the parameters of the MSWI process loop according to production requirements, production indicators and expert experience.

MSWI loop control software system is mainly composed of the MSWI process loop control program, which is downloaded to the controller. The software system communicates with the virtual object layer by receiving and sending electrical signals and using the variable conversion function; at the beginning of operation, it adjusts the parameters for the designed PID loop, and the parameters of the PID loop can be adjusted during the subsequent operation. Real-time changes through the MSWI monitoring software system to meet the requirements of different operating conditions. By receiving the signal returned by the software system of the MSWI instrument device, the variable value of the MSWI process instrument device is obtained, and the loop is adjusted according to the PID loop parameters based on the error between the actual measured value and the set value, and a signal is sent to the relevant actuator to generate a signal. It is used for MSWI object software system to carry out simulation until the tracking of the target actual measurement value to the set value is realized.

Figure 4:
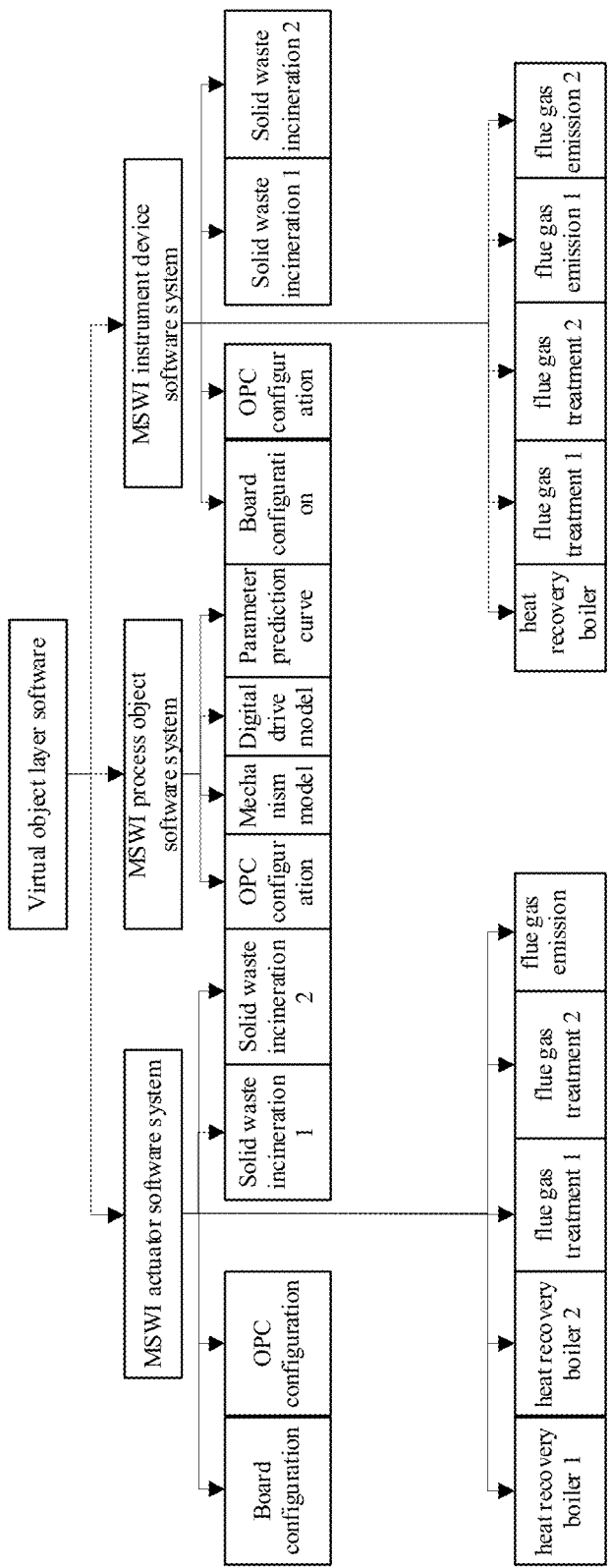
FIG. 4 is a structural diagram of virtual object layer software design in an embodiment of the present invention.

The software design structure diagram of the virtual object layer is shown in is FIG. 4. The virtual object layer is composed of the MSWI actuator software system, the MSWI object software system and the MSWI instrument device software system. Among them: the MSWI actuator software system includes the board configuration interface, OPC configuration interface, solid waste incineration 1 interface, etc.; MSWI object software system includes OPC configuration interface, mechanism model interface, digital drive model interface, etc.; MSWI instrument device software system includes board card configuration interface, OPC configuration interface, solid waste incineration 1 interface, waste heat boiler interface etc.

The data acquisition card driver calling function is developed in the MSWI actuator software system, which receives the electrical signal sent by the real equipment layer to the local, and at the same time converts it into the MSWI process actuator variable with actual physical meaning according to the variable relationship and the actuator model value; the Echarts chart developed by JavaScript is displayed on the front-end interface, and written to the OPC Server by using the OPC write function.

MSWI object software system is equipped with OPC Server to realize the signal transmission with the MSWI actuator software system and the MSWI instrument device software system. The OPC Server contains 146 points labels that are involved in the MSWI running which can be added as required.

MSWI process objects can be simulated in various ways according to the requirement, the software system has developed a model selection function that through the interface of the mechanism model and the interface of the digital drive model, the simulation mode of the MSWI process object can be selected and related parameters can be set; at the same time, the OPC Client is developed in order to realize the communication function, the Client uses the OPC read function to read the variable value of the MSWI process actuator in the OPC Server, and converts it according to the selected model requirements to perform a simulation; uses the OPC write function to output the variable value of the MSWI process instrument device. The value is written into the OPC Server and displayed on the foreground interface. It includes a database developed by MySQL to realize the storage of process data during MSWI operation and the later visual display.

In the MSWI instrument software system, the OPC Client is developed to realize the data communication with the MSWI object software system, and the OPC reading function is used to read the process variable value of the MSWI process instrumentation device in the OPC Server, and the Echarts chart developed by JavaScript is displayed on the front interface; then according to the variable relationship and the model of the instrument device, it is converted into an electrical signal, and at the same time, the driver of the data acquisition card is called to transmit the electrical signal back to the real equipment layer.

Figure 5:
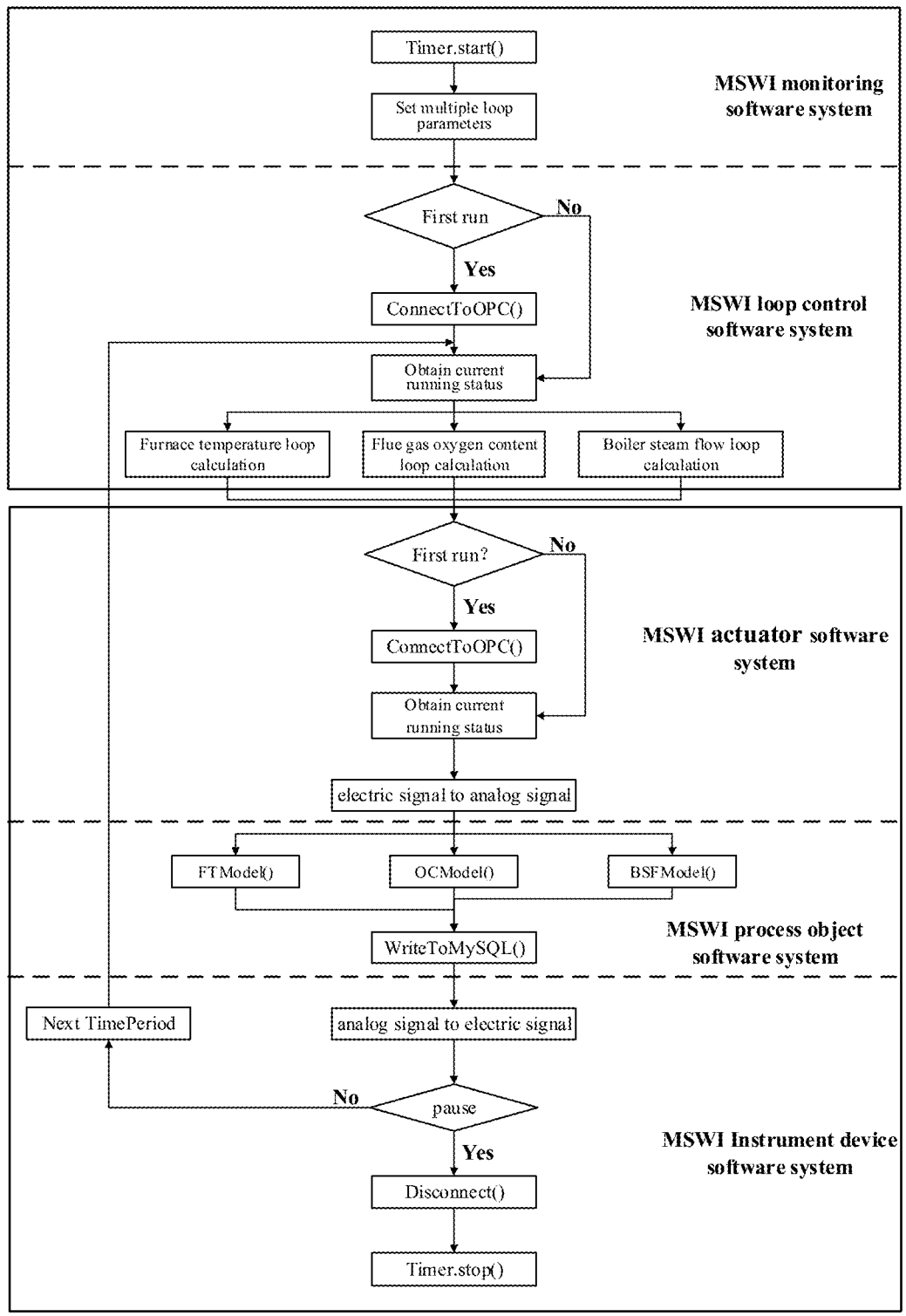
FIG. 5 is the flow chart of the operation mode ofthe embodiment of the present invention.

FIG. 5 shows the operation mode of the hardware-in-loop simulation experiment platform of multiple input and multiple output loop control for MSWI process. Firstly, through the MSWI monitoring software system, the OPC data communication method is used for graphical display and the setting of loop parameters (such as KP, KI, KD and set values in the PID loop); then, the MSWI loop control software system uses Ethernet to receive the loop parameters in the MSWI process monitoring software system for adjustment, and the output results of the PID loop are transmitted in the form of electrical signals; then, the MSWI actuator software system calls the data acquisition card to convert the electrical signals into actual physical meanings according to the actuator model. The value of the process variables are written into the OPC Server, and at the same time displayed on the front interface in the form of the Echarts dashboard; after that, the MSWI object software system uses the variable values of the MSWI process actuator in the OPC Server to simulate the object, and the obtained MSWI process instrument device variable values (such as temperature, oxygen content, etc.) are written to the OPC Server and displayed on the front interface, and the running process data is saved to the MySQL database for subsequent use; finally, the MSWI instrument device software system receives the MSWI data in the OPC Server. The variable values of the process instrument device are converted into electrical signals by calling the data acquisition card according to the instrument device model, and then transmitted to the MSWI loop control system, and at the same time, the process variable value of the MSWI process instrument device with actual physical meaning is displayed to the foreground in the form of an Echarts dashboard in the interface. If the actual measured value does not track the set value at this time, the loop adjustment is performed in the MSWI loop control system, and the above process is repeated until the actual measured value realizes the tracking of the set value.

The hardware-in-loop simulation experiment platform of multiple input and multiple output loop control for MSWI process provided by the invention is composed of four industrial personal computers and one controller. MSWI monitoring software system, MSWI object software system, MSWI actuator software system and MSWI instrument device software system run in an industrial personal computer respectively, configured as I5-6500 CPU, 8 GB memory and 64-bit Windows 7 professional edition system. At the same time, data acquisition cards are added to the industrial personal computer run by the MSWI actuator software system and the MSWI instrument device software system to realize the signal transmission between the platforms. The MSWI loop control software system is downloaded in the controller, which consists of 4 air switches, 1 DC power supply, 1 communication modules, 1 CPU module, 6 analog 8-input 8-output modules, 3 analog 16 input module, 3 analog 16 output modules, 5 digital input and output modules and 9 board terminal boards.

Figure 6A:
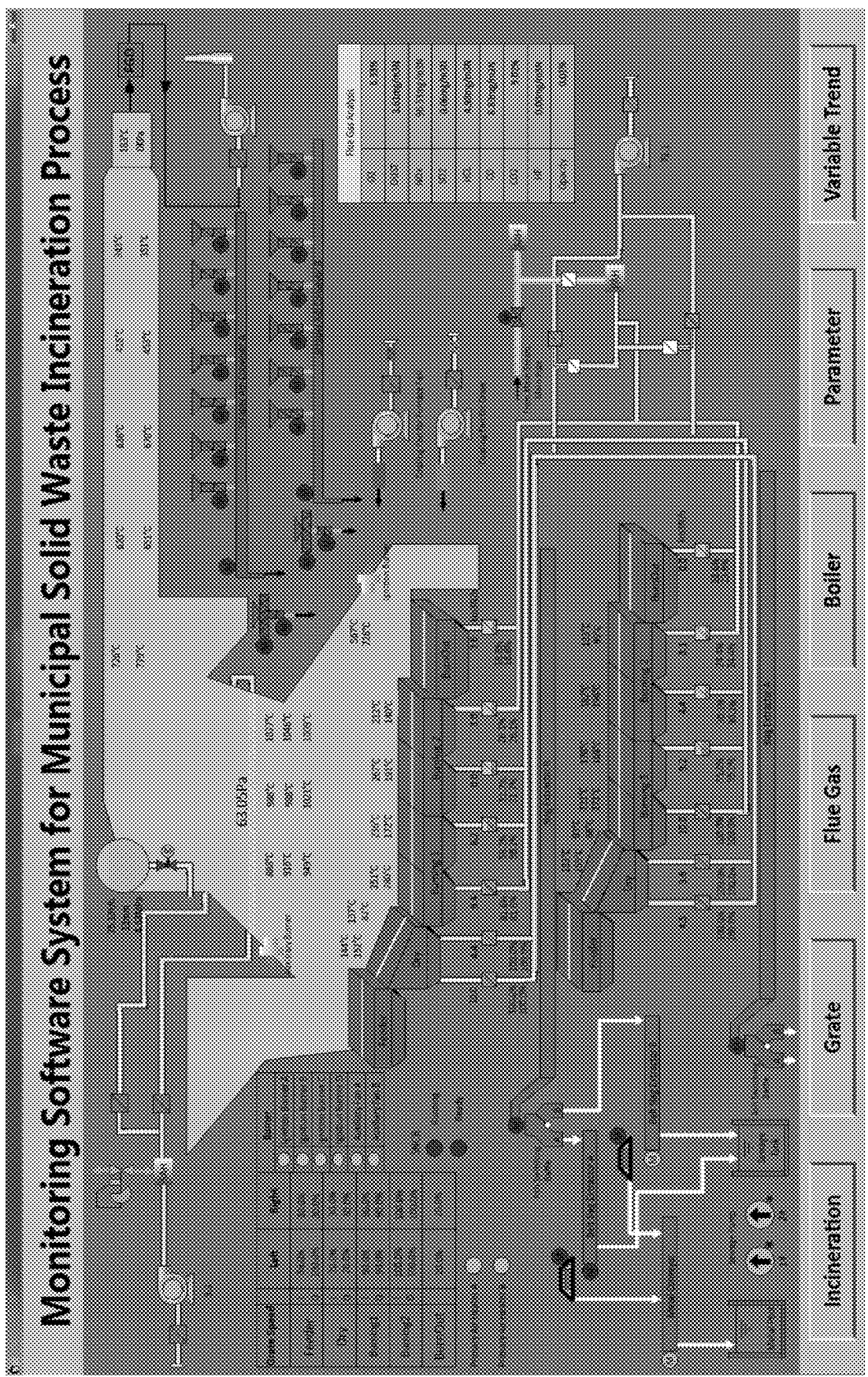
FIG. 6a is an interface diagram 1 of the MSWI monitoring software system according to the embodiment of the present invention.
Figure 6B:
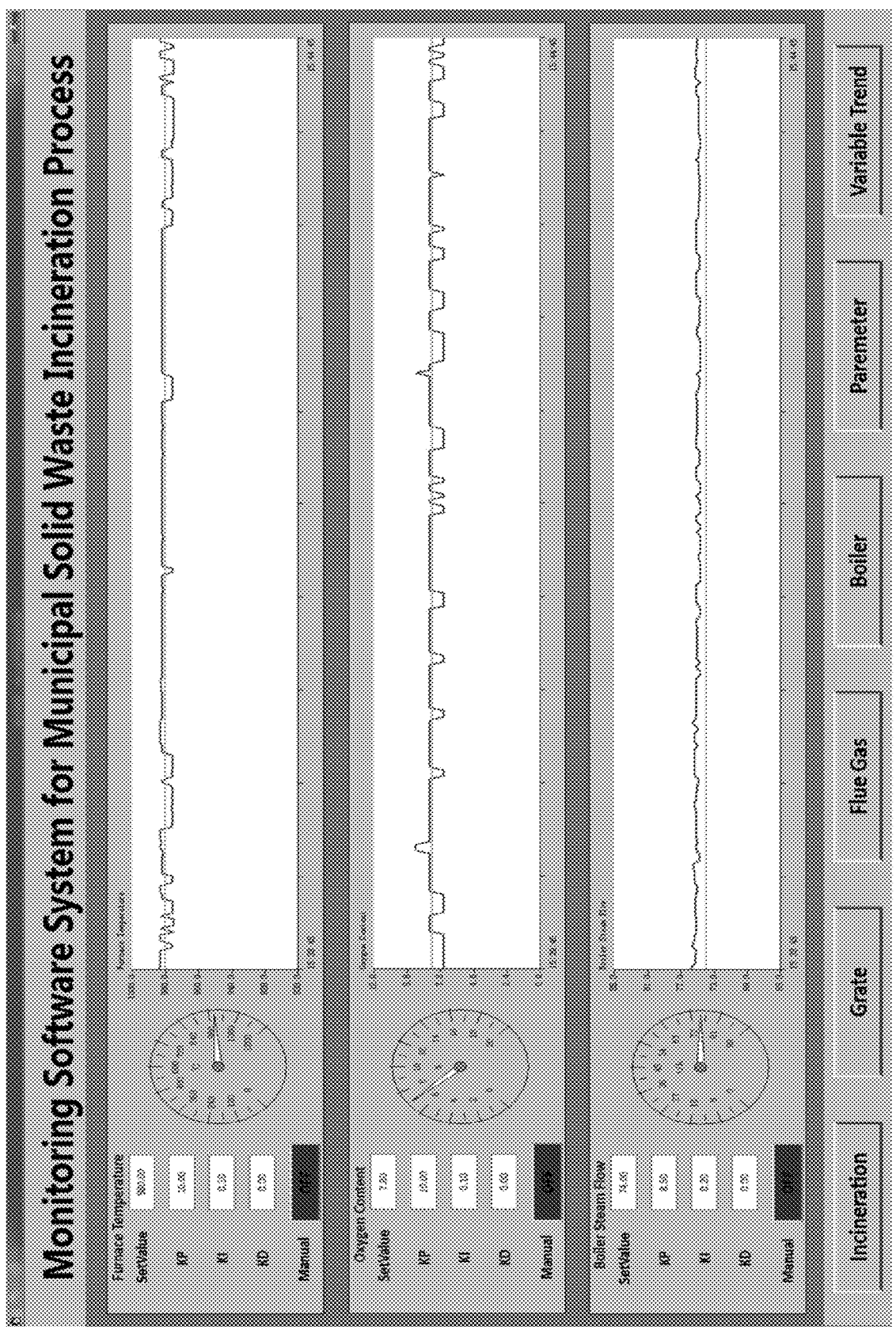
FIG. 6b is an interface diagram 2 of the MSWI monitoring software system according to the embodiment of the present invention.
Figure 6C:
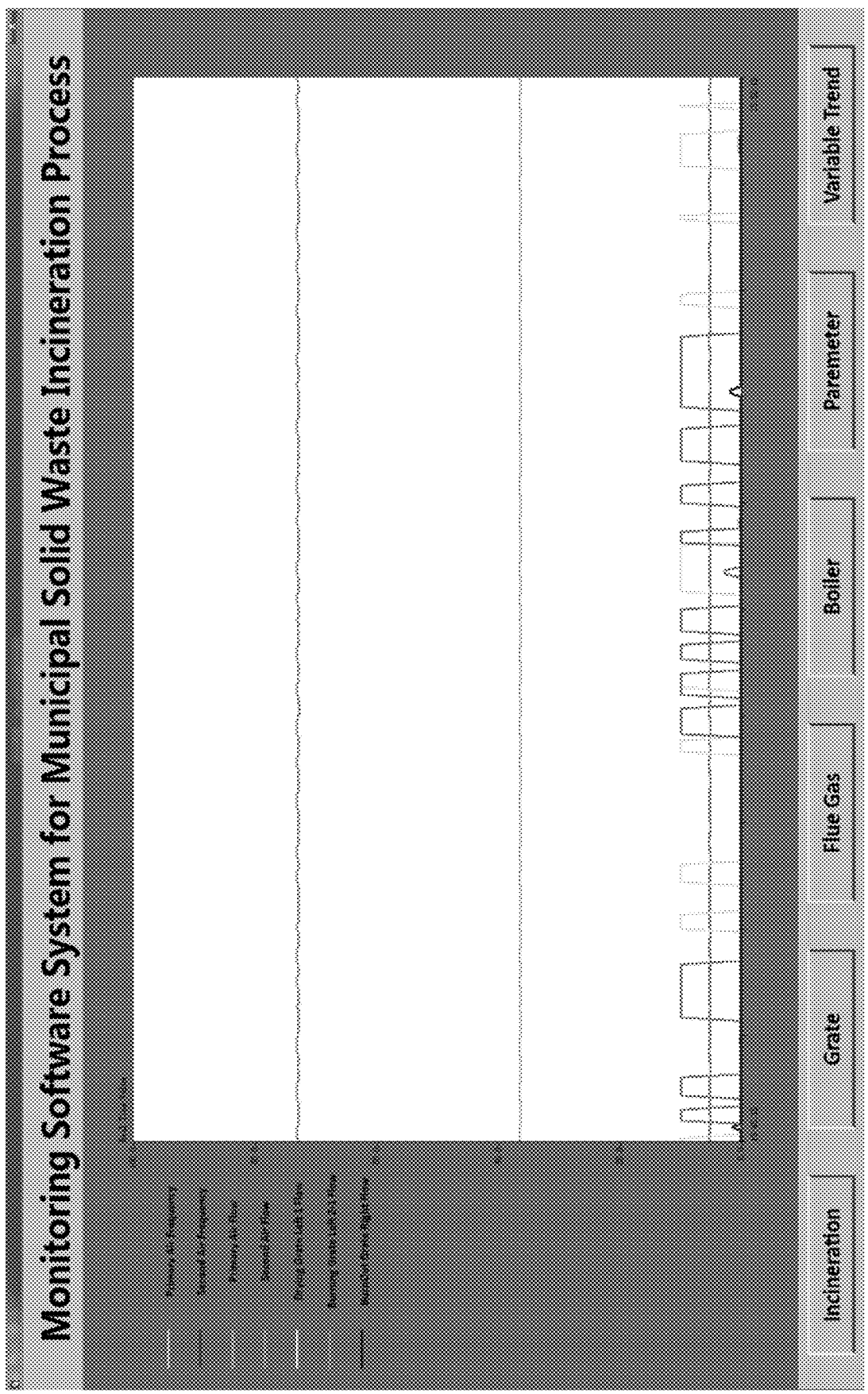
FIG. 6c is an interface diagram 3 of the MSWI monitoring software system according to the embodiment of the present invention.

In order to verify the validity of the simulation experiment platform of the present invention, the setting of furnace temperature loop, flue gas oxygen content loop and main steam flow loop in MSWI process is verified: the MSWI monitoring software system interface is shown in FIG. 6a-6c, at the beginning of the operation of the simulation experiment platform, loop parameters were set according to the furnace temperature, flue gas oxygen content and main steam flow rate. After the operation started, FIG. 6a showed the current running state of the MSWI simulation process. FIG. 6b shows PID loop parameter setting and tracking effect, and FIG. 6c shows the trend chart of main process variables in MSWI simulation.

Figure 7:
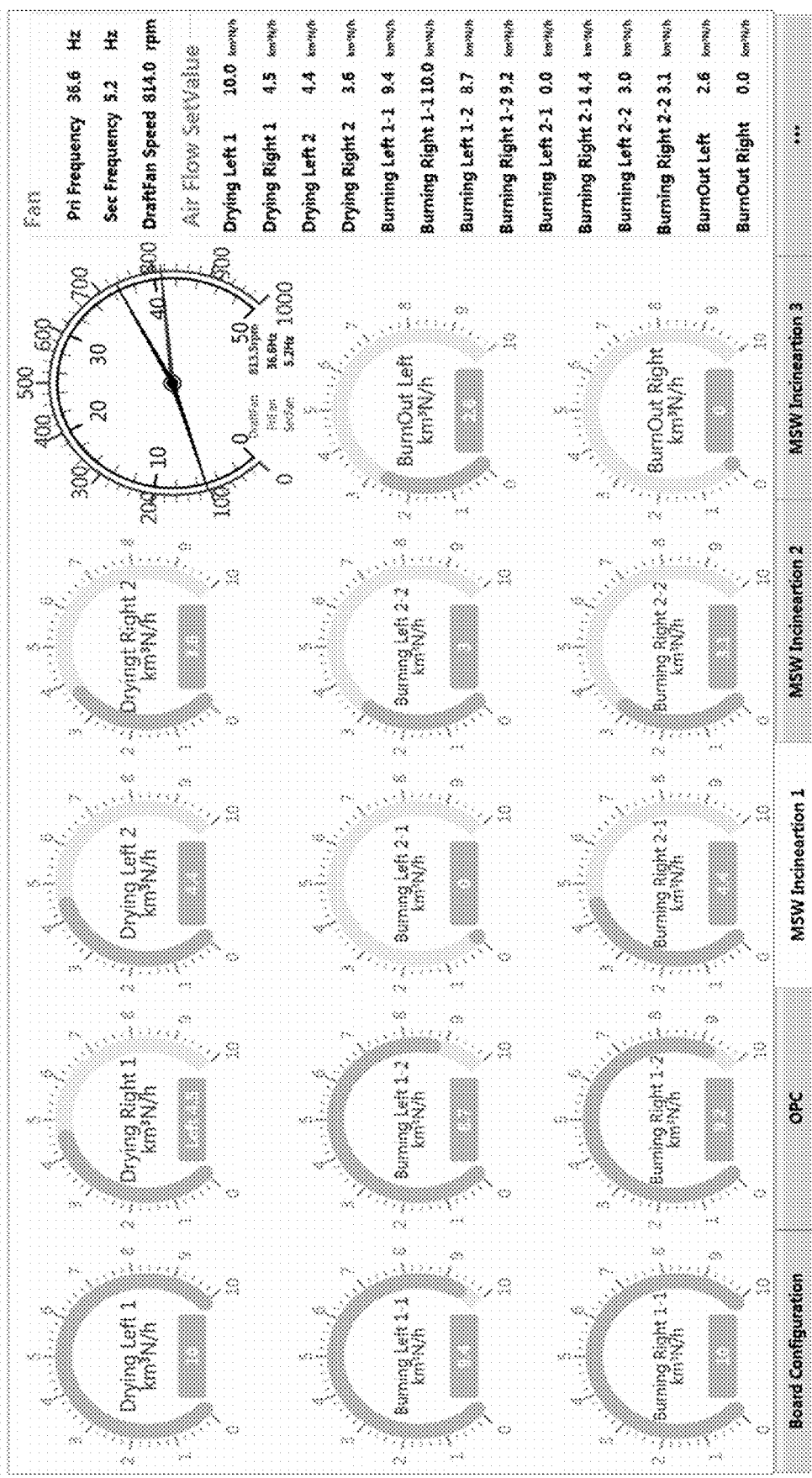
FIG. 7 is an interface diagram of the software system of the MSWI actuator according to the embodiment of the present invention.
Figure 8:
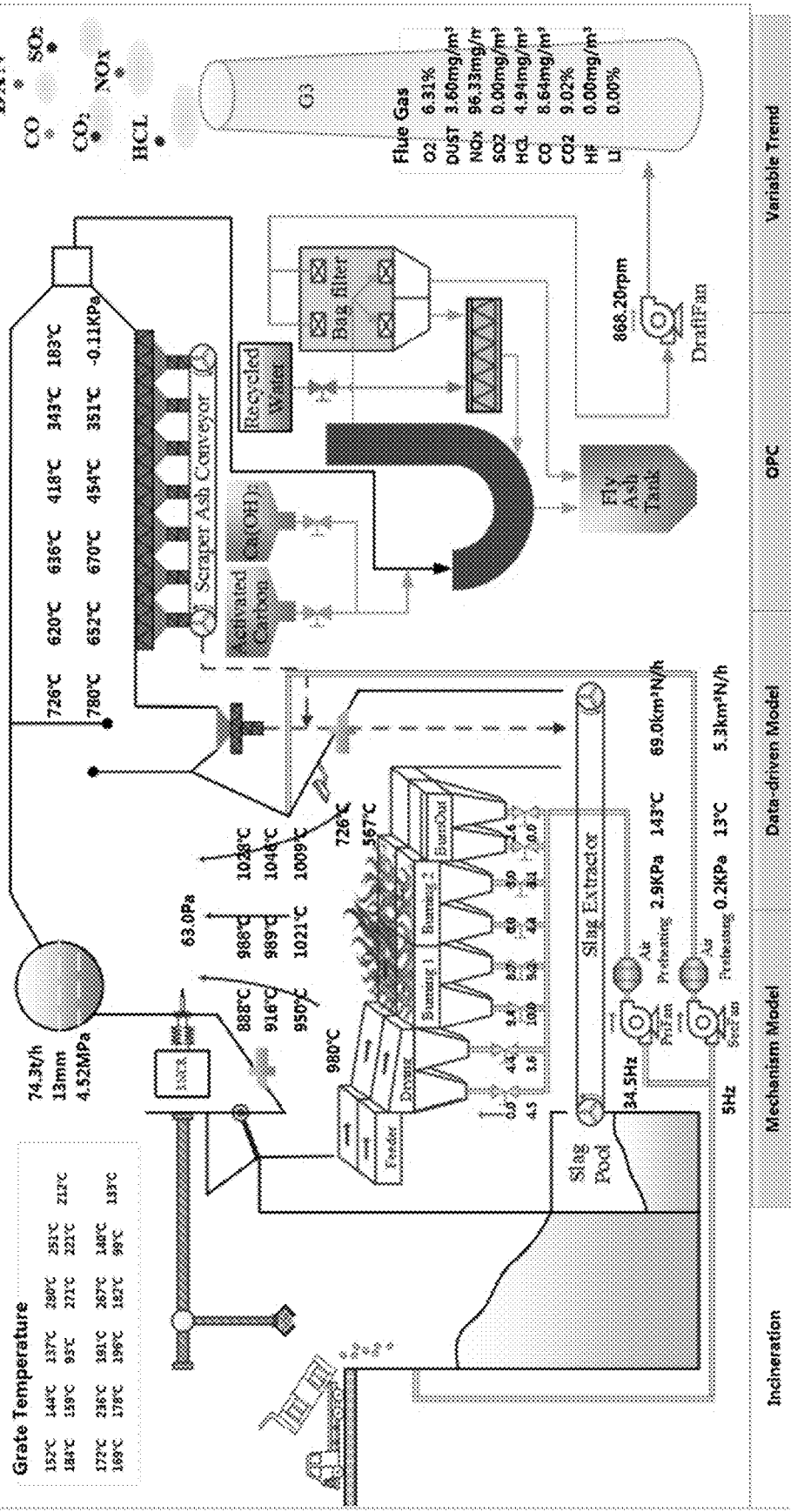
FIG. 8 is an interface diagram of the MSWI process object software system according to the embodiment of the present invention.
Figure 9:
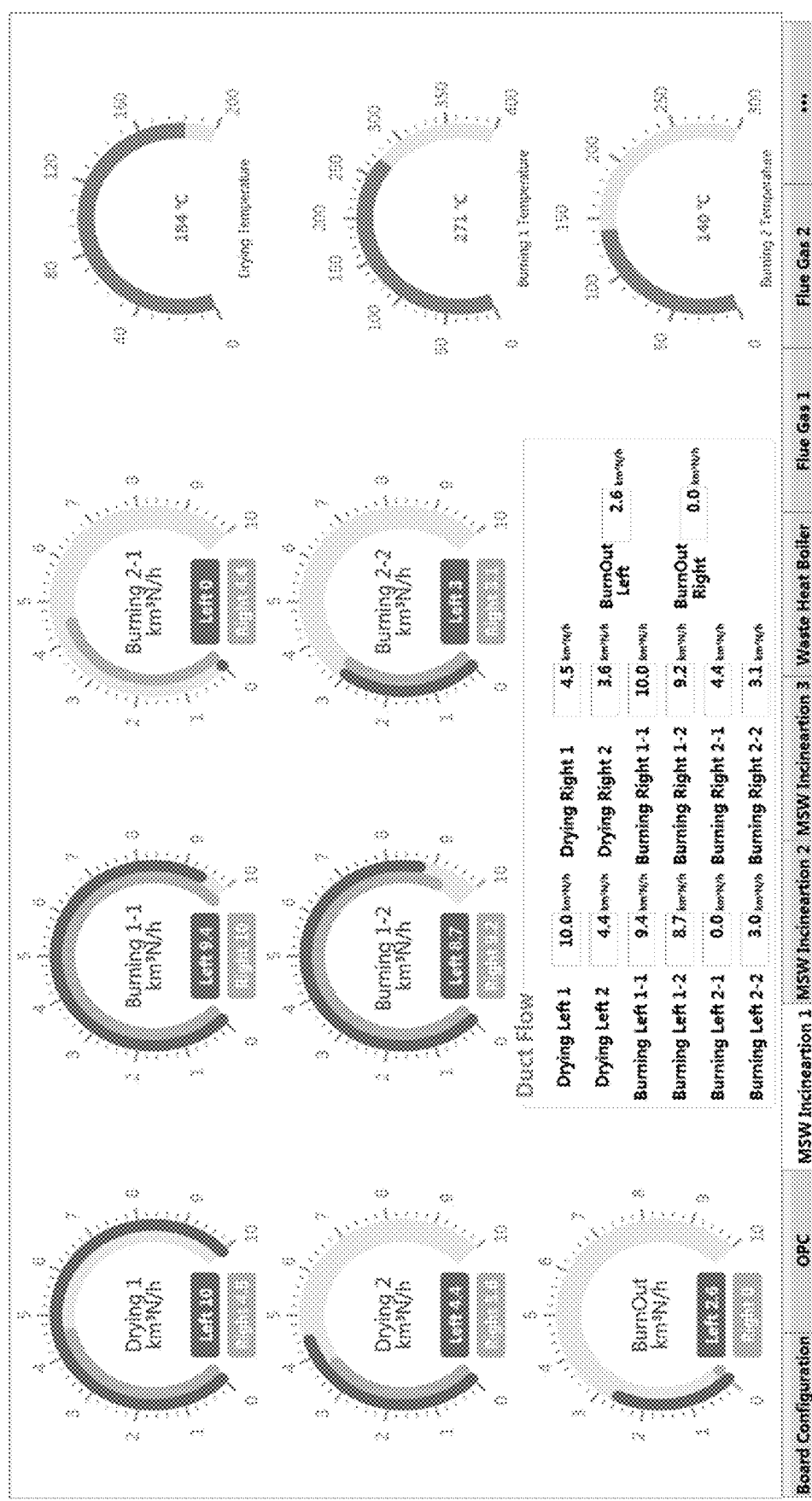
FIG. 9 is an interface diagram of the software system of the MSWI instrument device according to the embodiment of the present invention.

The foreground interface of the MSWI actuator software system is shown in FIG. 7. The data acquisition card driver is called in real time to receive the electrical signal issued by the MSWI loop control software system, and the MSWI process is output according to the actuator model. The mechanism process variable value is written into the OPC Server and displayed on the foreground interface at the same time; the foreground interface of the MSWI object software system is shown in FIG. 8. After receiving the value of the process variable value of the MSWI process actuator in the OPC Server, the variable conversion is performed. The Matlab object model embedded with offline training is used for simulation to obtain the process variable values of the MSWI process instrument device, and the simulation results are written into the OPC Server and displayed on the front interface at the same time; the software system of the MSWI instrument device is shown in FIG. 9, receiving the process variable value of the MSWI process instrument device in the OPC Server, and displayed on the front interface, at the same time, it is converted into an electrical signal according to the model of the instrument device, and then sent back to the MSWI loop control software system by hard wirings.

The above experimental results show that the hardware-in-loop simulation experiment platform of multiple input and multiple output loop control for MSWI process proposed by the present invention can realize the effective transmission of signals between platform, and satisfies the real-time tracking between the actual simulation value and the set value in the three designed loops after the PID loop adjustment.

The hardware-in-loop simulation experiment platform of multiple input and multiple output loop control for MSWI process provided by the present invention installs the MSWI actuator model and the MSWI instrument device model in two industrial personal computers respectively, to realize the signal transmission between the loop control system and the actuator and the instrument device by using the data acquisition card. The type of signal transmission in the field is simulated truly, avoiding the unknown factors in the field such as lack of signal transmission interruption and signal interference in the traditional simulation experiment platform. By modeling three key controlled process variables and adjusting PID loop, the effectiveness of the proposed hardware-in-loop simulation experiment platform of multiple input and multiple output loop control for MSWI process is verified. It also provides a reliable engineering verification environment for other research on MSWI process optimization control.

In the invention, specific examples have been used to illustrate the principle and implementation of the present invention. The description of the above embodiments is only used to help to understand the method of the present invention and its core idea. At the same time, for the general technical personnel in this field, there will be changes in the specific implementation mode and application range according to the idea of the invention. In summary, the contents of this specification should not be construed as limiting the present invention.

We claim:

1. A hardware-in-loop simulation experiment platform of a multiple input and multiple output loop control for a municipal solid waste incineration (MSWI) process, comprising:

a real equipment layer and a virtual object layer, wherein communication between the real equipment layer and the virtual object layer is realized through wirings and a data acquisition card, and communication within the real equipment layer and within the virtual object layer is realized in an Object Linking and Embedding (OLE) for Process Control (OPC) mode through Ethernet;

wherein the real equipment layer comprises a monitoring computer and a control computer;
wherein the monitoring computer comprises a first processor and a first memory storing first instructions, and the first instructions are executed by the first processor to perform first operations comprising: monitoring a MSWI process state, downloading a program into the control computer, and setting proportion integral differential (PID) loop parameters;
wherein the control computer comprises a second processor which executes the downloaded program to perform second operations comprising: performing loop control for the MSWI process and performing variable conversion for the MSWI process;
wherein the virtual object layer includes a MSWI actuator model running on a first computer, a MSWI instrument device model running on a second computer, and a MSWI process object model running on a third computer;
and the MSWI process object model is based on an ensemble decision tree algorithm to predict three controlled variables of furnace temperature (FT), flue gas oxygen content (OC) and main steam flow rate (BSF);
wherein:
the MSWI actuator model simulates signals sent from the real equipment layer and transmits MSWI process actuator variables to the MSWI process object model;
the MSWI instrument device model receives MSWI process instrument device variables obtained from simulation of the MSWI process object model, performs simulation, and transmits to the real equipment layer;
the MSWI process object model is established by at least one of the following methods: data simulation, mechanism modeling and data-driven;
the MSWI process object model receives the MSWI process actuator variables, conducts simulation on the MSWI process actuator variables to obtain the MSWI process instrument device variables and transmits the MSWI process instrument device variables to the MSWI instrument device model;
wherein the second operations further comprise converting the MSWI process actuator variables to a voltage signal output;
the MSWI actuator model is expressed by a first-order transfer function model with a time delay;
and a signal conversion is established between the real equipment layer and the first computer running the MSWI actuator model, wherein the signal conversion is expressed as:

$$P_{true}^A = \frac{P_{max}^A - P_{min}^A}{U_{max}^A - U_{min}^A} * U_{true}^A$$

wherein: $P_{max}^A$ is an upper limit of the MSWI process actuator variables with a first physical value, $P_{min}^A$ is a lower limit of the MSWI process actuator variables with a second physical value, $U_{max}^A$ is an upper limit of the voltage signal output after the MSWI process actuator variables are converted, $U_{min}^A$ is a lower limit of the voltage signal output after the MSWI process actuator variables are converted, $U_{true}^A$ is a first current actual value of an electrical signal of the MSWI process actuator variables, $P_{true}^A$ is a second current actual value of the MSWI process actuator variables with a third physical value.

2. The hardware-in-loop simulation experiment platform of the multiple input and multiple output loop control for the MSWI process according to claim 1, wherein the MSWI actuator model is a feeder, the feeder is described as follows:

$$\dot{F}_{feeder} = -\frac{1}{T_{feeder}} F_{feeder} + \frac{K_{feeder}}{T_{feeder}} U_{feeder}(t - \tau)$$

wherein:
$F_{feeder}$ is a feeding speed of the feeder, $U_{feeder}$ is a frequency of a motor of the feeder, $T_{feeder}$ is a response time constant of the feeder, and $K_{feeder}$ is a ratio between the frequency of the motor of the feeder and the feeding speed of the feeder in a steady state, t is a lag time.

3. The hardware-in-loop simulation experiment platform of the multiple input and multiple output loop control for the MSWI process according to claim 1, wherein the second operations further comprise converting the MSWI process instrument device variables to a second voltage signal output;
the MSWI instrument device model is expressed by a first-order transfer function model;
and a signal conversion is established between the real equipment layer and the second computer running the MSWI instrument device model, the signal conversion is expressed as:

$$U_{true}^I = \frac{U_{max}^I - U_{min}^I}{P_{max}^I - P_{min}^I} * P_{true}^I$$

wherein:
$P_{max}^I$ is an upper limit of the MSWI process instrument device variables, $P_{min}^I$ is a lower limit of the MSWI process instrument device variables, $U_{max}^I$ is an upper limit of the second voltage signal output after the MSWI process instrument device variables are converted, $U_{min}^I$ is the lower limit of the second voltage signal output after the MSWI process instrument device variables are converted, $U_{true}^I$ is a current real value of an electrical signal of the MSWI process instrument device variables, and $P_{true}^I$ is a third current actual value of the MSWI process instrument device variables with a fourth physical value.

4. The hardware-in-the-loop simulation experiment platform of the multiple input and multiple output loop control for the MSWI process according to claim 3, wherein the MSWI instrument device model is a primary air flowmeter, the MSWI instrument device model is described as:

$$\dot{Q}_{pri} = -\frac{1}{T_{pri}} Q_{pri} + \frac{K_{pri}}{T_{pri}} U_{pri}$$

wherein:
$Q_{pri}$ is a primary air flow per unit time, $U_{pri}$ is a primary air valve opening, $T_{pri}$ is a primary air volume response time constant, and $K_{pri}$, is proportional relationship between the primary air valve opening and the primary air flow per unit time in a steady state.

5. A hardware-in-loop simulation experiment platform of a multiple input and multiple output loop control for a municipal solid waste incineration (MSWI) process, comprising:
a real equipment layer and a virtual object layer, wherein communication between the real equipment layer and the virtual object layer is realized through wirings and a data acquisition card, and communication within the real equipment layer and within the virtual object layer is realized in an Object Linking and Embedding (OLE) for Process Control (OPC) mode through Ethernet;
wherein the real equipment layer comprises a monitoring computer and a control computer;
wherein the monitoring computer comprises a first processor and a first memory storing first instructions, and the first instructions are executed by the first processor to perform first operations comprising: monitoring a MSWI process state, downloading a program into the control computer, and setting proportion integral differential (PID) loop parameters;
wherein the control computer comprises a second processor which executes the downloaded program to perform second operations comprising: performing loop control for the MSWI process and performing variable conversion for the MSWI process;
wherein the virtual object layer includes a MSWI actuator model running on a first computer, a MSWI instrument device model running on a second computer and a MSWI process object model running on a third computer;
and the MSWI process object model is based on an ensemble decision tree algorithm to predict three controlled variables of furnace temperature (FT), flue gas oxygen content (OC) and main steam flow rate (BSF);
wherein:
the MSWI actuator model simulates signals sent from the real equipment layer and transmits MSWI process actuator variables to the MSWI process object model;
the MSWI instrument device model receives MSWI process instrument device variables obtained from simulation of the MSWI process object model, performs simulation, and transmits to the real equipment layer;
the MSWI process object model is established by at least one of the following methods: data simulation, mechanism modeling and data-driven;
the MSWI process object model receives the MSWI process actuator variables, conducts simulation on the MSWI process actuator variables to obtain the MSWI process instrument device variables and transmits the MSWI process instrument device variables to the MSWI instrument device model;
wherein the MSWI actuator model is a feeder, the feeder is described as follows:

$$\dot{F}_{feeder}=(1/T_{feeder})F_{feeder}+K_{feeder}/T_{feeder}U_{feeder}(t-T)$$

wherein:
$F_{feeder}$ is a feeding speed of the feeder, $U_{feeder}$ is a frequency of a motor of the feeder, $T_{feeder}$ is a response time constant of the feeder, and $K_{feeder}$ is a ratio between the frequency of the motor of the feeder and the feeding speed of the feeder in a steady state, t is a lag time.

6. A hardware-in-loop simulation experiment platform of a multiple input and multiple output loop control for a municipal solid waste incineration (MSWI) process, comprising:
a real equipment layer and a virtual object layer, wherein communication between the real equipment layer and the virtual object layer is realized through wirings and a data acquisition card, and communication within the real equipment layer and within the virtual object layer is realized in an Object Linking and Embedding (OLE) for Process Control (OPC) mode through Ethernet;
wherein the real equipment layer comprises a monitoring computer and a control computer;
wherein the monitoring computer comprises a first processor and a first memory storing first instructions, and the first instructions are executed by the first processor to perform first operations comprising: monitoring a MSWI process state, downloading a program into the control computer, and setting proportion integral differential (PID) loop parameters;
wherein the control computer comprises a second processor which executes the downloaded program to perform second operations comprising: performing loop control for the MSWI process and performing variable conversion for the MSWI process;
wherein the virtual object layer includes a MSWI actuator model running on a first computer, a MSWI instrument device model running on a second computer and a MSWI process object model running on a third computer;
and the MSWI process object model is based on an ensemble decision tree algorithm to predict three controlled variables of furnace temperature (FT), flue gas oxygen content (OC) and main steam flow rate (BSF);
wherein:
the MSWI actuator model simulates signals sent from the real equipment layer and transmits MSWI process actuator variables to the MSWI process object model;
the MSWI instrument device model receives MSWI process instrument device variables obtained from simulation of the MSWI process object model, performs simulation, and transmits to the real equipment layer;
the MSWI process object model is established by at least one of the following methods: data simulation, mechanism modeling and data-driven;
the MSWI process object model receives the MSWI process actuator variables, conducts simulation on the MSWI process actuator variables to obtain the MSWI process instrument device variables and transmits the MSWI process instrument device variables to the MSWI instrument device model;
wherein the second operations further comprise converting the MSWI process instrument device variables to a voltage signal output;
the MSWI instrument device model is expressed by a first-order transfer function model;
and a signal conversion is established between the real equipment layer and the second computer running the MSWI instrument device model, wherein the signal conversion is expressed as:

$$U_{true}^{I}=U_{max}^{I}-U_{min}^{I}/P_{max}^{I}-P_{min}^{I}P_{true}^{I}$$

wherein:
$P_{max}^{I}$ is an upper limit of the MSWI process instrument device variables, $P_{min}^{I}$ is a lower limit of the MSWI process instrument device variables, $U_{max}^{I}$ is an upper limit of a voltage signal output after the MSWI process instrument device variables are conversed, $U_{min}^{I}$ is the lower limit of the voltage signal output after the MSWI process instrument device variables are conversed, $U_{true}^{I}$ is a current real value of an electrical signal of the MSWI process instrument device variables, and $P_{true}^{I}$ is a current actual real value of the MSWI process instrument device variables with a physical value.

7. The hardware-in-the-loop simulation experiment platform of the multiple input and multiple output loop control for the MSWI process according to claim 6, wherein the MSWI instrument device model is a primary air flowmeter, the primary air flowmeter is described as:

$\dot{Q}_{pri} = 1/Q_{pri} + K_{pri}/T_{pri}U_{pri}$ wherein:

$Q_{pri}$ is a primary air flow per unit time, $U_{pri}$ is a primary air valve opening, $T_{pri}$ is a primary air volume response time constant, and $K_{pri}$, is proportional relationship between the primary air valve opening and the primary air flow per unit time in a steady state.

* * * * *